(12) United States Patent
Afshari et al.

(10) Patent No.: US 8,891,006 B2
(45) Date of Patent: Nov. 18, 2014

(54) WAFER LEVEL CAMERA MODULE WITH ACTIVE OPTICAL ELEMENT

(75) Inventors: Bahram Afshari, Los Altos, CA (US); John Toor, Palo Alto, CA (US); Samuel Wennyann Ho, Foster City, CA (US)

(73) Assignee: LensVector, Inc., Mountainview, CA (US)

( * ) Notice: Subject to any disclaimer, the term of this patent is extended or adjusted under 35 U.S.C. 154(b) by 242 days.

(21) Appl. No.: 13/338,756

(22) Filed: Dec. 28, 2011

(65) Prior Publication Data

US 2012/0140101 A1    Jun. 7, 2012

Related U.S. Application Data

(63) Continuation-in-part of application No. PCT/US2010/039595, filed on Jun. 23, 2010.

(60) Provisional application No. 61/221,408, filed on Jun. 29, 2009.

(51) Int. Cl.
*H04N 5/225* (2006.01)
*H04N 5/232* (2006.01)

(52) U.S. Cl.
CPC ................................. *H04N 5/2257* (2013.01)
USPC ............................ 348/374; 348/340; 348/357

(58) Field of Classification Search
CPC .. H04N 5/2252; H04N 5/2254; H04N 5/2257
USPC .................. 348/335, 340, 357, 373, 374, 376
See application file for complete search history.

(56) References Cited

U.S. PATENT DOCUMENTS

| | | |
|---|---|---|
| 4,781,445 A | 11/1988 | Baba et al. |
| 5,592,314 A | 1/1997 | Ogasawara et al. |
| 5,808,679 A | 9/1998 | Shih |

(Continued)

FOREIGN PATENT DOCUMENTS

| | | |
|---|---|---|
| JP | 2005084387 A | 3/2005 |
| JP | 2006243573 A | 9/2006 |

(Continued)

OTHER PUBLICATIONS

European Search Report for European Patent Application No. 09756991.7—European National Phase of PCT/CA2009/000742; Search Report Dated Dec. 30, 2011.

(Continued)

*Primary Examiner* — John Villecco
(74) *Attorney, Agent, or Firm* — J-Tek Law PLLC; Jeffrey D. Tekanic; Scott T. Wakeman

(57) ABSTRACT

A wafer level camera module can be easily connected to a host device via mounting surface contacts. The module includes an electrically controllable active optical element and a flexible printed circuit that provides electrical connection between the optical element and surface conductors on a mounting surface of the module. The surface conductors can be a group of solder balls, and the module can have another group of solder balls that make connection to another electrical component of the module, such as an image sensor. All of the solder balls can be coplanar in a predetermined grid pattern, and all of the components of the device can be surrounded by a housing such that the camera module is an easily mounted ball grid array type package.

27 Claims, 9 Drawing Sheets

(56) References Cited

U.S. PATENT DOCUMENTS

| | | | |
|---|---|---|---|
| 6,359,674 B1 | 3/2002 | Horiuchi | |
| 7,340,161 B2* | 3/2008 | Asai et al. | 396/89 |
| 7,369,327 B1 | 5/2008 | Nishioka | |
| 7,469,100 B2 | 12/2008 | Toor et al. | |
| 7,614,807 B2* | 11/2009 | Jao | 396/529 |
| 7,619,684 B2* | 11/2009 | Nishida et al. | 348/374 |
| 7,672,060 B2* | 3/2010 | Campbell | 359/666 |
| 7,715,107 B2 | 5/2010 | Loopstra et al. | |
| 7,959,291 B2 | 6/2011 | Isobe et al. | |
| 8,115,856 B2* | 2/2012 | Cheng | 348/357 |
| 8,248,523 B2* | 8/2012 | Chua et al. | 348/374 |
| 8,411,193 B2* | 4/2013 | Chiu | 348/335 |
| 8,479,387 B2* | 7/2013 | Chiang | 29/848 |
| 8,559,806 B2* | 10/2013 | Seo | 396/133 |
| 8,564,718 B2* | 10/2013 | Shiraishi | 348/374 |
| 8,743,263 B2* | 6/2014 | Bianchi et al. | 348/335 |
| 2002/0033911 A1 | 3/2002 | Ishida et al. | |
| 2004/0184163 A1 | 9/2004 | Nishioka et al. | |
| 2006/0103758 A1 | 5/2006 | Yoon et al. | |
| 2006/0203875 A1 | 9/2006 | Frenzel et al. | |
| 2007/0031137 A1 | 2/2007 | Bogdan et al. | |
| 2007/0063048 A1 | 3/2007 | Havens et al. | |
| 2007/0229754 A1 | 10/2007 | Galstian et al. | |
| 2007/0242173 A1 | 10/2007 | Blum et al. | |
| 2008/0088756 A1 | 4/2008 | Tseng et al. | |
| 2008/0144186 A1 | 6/2008 | Feng et al. | |
| 2008/0165427 A1 | 7/2008 | Tseng et al. | |
| 2008/0251707 A1 | 10/2008 | Kathman et al. | |
| 2008/0277480 A1 | 11/2008 | Thuries et al. | |
| 2008/0297911 A1 | 12/2008 | Christenson et al. | |
| 2009/0134483 A1 | 5/2009 | Weng et al. | |
| 2009/0190232 A1 | 7/2009 | Craen et al. | |
| 2009/0213232 A1* | 8/2009 | Asakura et al. | 348/208.4 |
| 2009/0302116 A1 | 12/2009 | Tan et al. | |
| 2009/0322929 A1* | 12/2009 | Webster | 348/340 |
| 2010/0247086 A1* | 9/2010 | Tallaron et al. | 396/133 |
| 2010/0276492 A1 | 11/2010 | Wang et al. | |
| 2010/0295987 A1 | 11/2010 | Berge | |
| 2011/0134303 A1* | 6/2011 | Jung et al. | 348/340 |
| 2011/0221950 A1* | 9/2011 | Oostra et al. | 348/335 |
| 2011/0261253 A1* | 10/2011 | Chang | 348/374 |
| 2012/0019761 A1 | 1/2012 | Nystrom et al. | |
| 2012/0026451 A1* | 2/2012 | Nystrom | 349/200 |
| 2012/0236248 A1* | 9/2012 | Kang et al. | 349/200 |
| 2012/0315953 A1* | 12/2012 | Du et al. | 455/556.1 |
| 2013/0057757 A1* | 3/2013 | Ryou | 348/374 |
| 2014/0002727 A1* | 1/2014 | Kim et al. | 348/374 |
| 2014/0028905 A1* | 1/2014 | Kim | 348/374 |
| 2014/0029120 A1* | 1/2014 | Kim | 359/824 |
| 2014/0092296 A1* | 4/2014 | Han | 348/373 |

FOREIGN PATENT DOCUMENTS

| | | | |
|---|---|---|---|
| JP | 2006309011 A | * | 11/2006 |
| JP | 2007208587 A | * | 8/2007 |
| KR | 10-0856092 B1 | * | 8/2008 |
| WO | 2005098479 A1 | | 10/2005 |
| WO | WO 2006106953 A1 | * | 10/2006 |
| WO | WO2007098602 | | 9/2007 |
| WO | WO2008041469 | | 4/2008 |
| WO | WO2009153764 | | 12/2009 |
| WO | WO2010022503 | | 3/2010 |
| WO | WO2010083211 | | 7/2010 |
| WO | WO 2010129454 A1 | * | 11/2010 |
| WO | WO2010129460 | | 11/2010 |

OTHER PUBLICATIONS

International Preliminary Report on Patentability for PCT/US2010/039595 issued Jan. 12, 2012.
International Search Report and Written Opinion for PCT/US2010/033347, Aug. 23, 2010.
International Search Report and Written Opinion for PCT/US2010/039595 issued Sep. 13, 2011.
International Search Report for PCT/US2010/033357 issued Apr. 10, 2010.
Written Opinion for PCT/US2010/033357 issued Apr. 10, 2010.

* cited by examiner

FIG_3

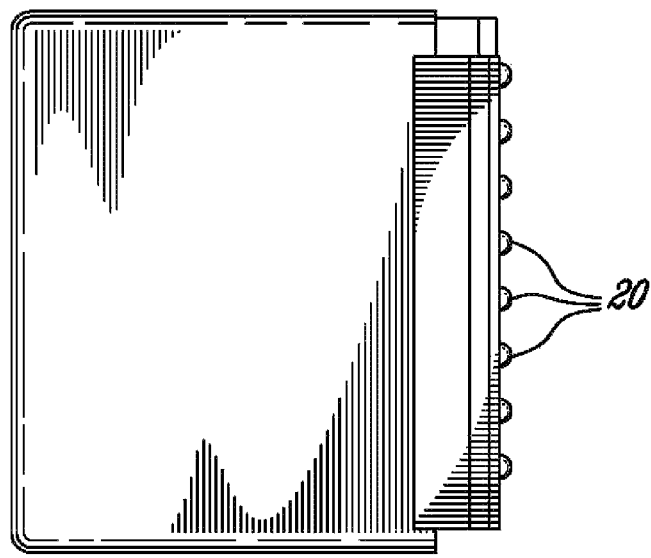
FIG_5A
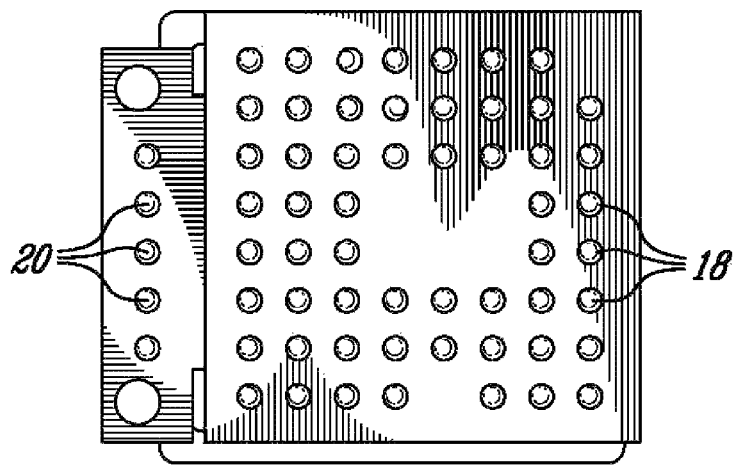
FIG_5B

WAFER LEVEL CAMERA MODULE WITH ACTIVE OPTICAL ELEMENT

RELATED APPLICATIONS

The application claims priority from U.S. Provisional Patent Application Ser. No. 61/221,408 filed 29-JUN-2009 and further claims priority from PCT International Patent Application PCT/US2010/039595 filed 23 Jun. 2010 now published under WO 02011/008443, all of which are incorporated herein by reference.

TECHNICAL FIELD

The present invention relates generally to the field of optical devices and, more specifically, to a wafer level camera module with an active optical element and the packaging thereof.

BACKGROUND

Lens structures for optical devices, such as cameras, consist of multiple lens elements assembled in a single barrel or stacked in a wafer form, utilizing spacers, to create fixed focus lens assemblies. These lens structures have a fixed focal plane and are mechanically moved to focus on objects that are located at varying distances from the camera system.

A wafer level camera module includes a CMOS sensor, normally packaged in a Chip Scale Package (CSP), and a wafer level lens structure, having multiple replicated lenses on glass substrates. In such a configuration, no electrical connection is required between these parts.

Tunable liquid crystal lenses (TLCL) having a flat layered construction are described in PCT International Patent Application Publications no. WO 2007/098602, published on Sep. 7, 2007, WO/2009/146529 and WO/2009/146530, published on 10 Dec. 2009, and WO/2010/022503, published on 4 Mar. 2010, the specifications of which are hereby incorporated by reference as if fully set forth herein.

In U.S. Provisional Patent Application Ser. No. 61/175,025, which was filed May 3, 2009 and the substance of which is incorporated herein by reference, there is disclosed a wafer level camera with an active optical element positioned within a lens stack of the lens assembly. By applying a required electrical signal to the active element, it is possible to modify an optical property of the lens assembly without any mechanical movement. In the case of a TLCL as the active optical element, the focal plane of the lens structure can be moved, thus creating a variable focus device. With appropriate feedback such a variable focus device can be used to provide auto focus without mechanical movement.

When a wafer level camera includes an active optics element, such as a TLCL, one or more electrical connections are required to provide at least one electrical contact between the active optics element and the camera substrate (electronics), such as a Chip Scale Package or a sensor on a Printed Circuit Board (PCB). In U.S. Provisional Patent Application Ser. No. 61/175,025, which is incorporated herein by reference, this requirement is met by an integrated electrical connection structure that is provided to enable electrical contacts as part of the lens barrel assembly. At least one electrical contact provides an electrically conductive path between an outer surface of the lens mounting structure and the active optical element. The contact can be a stamped metallic piece (lead) with an incorporated spring element to ensure reliable electrical connection to a contact on a receiving device to which the lens apparatus is mounted. Alternatively, a Molded Interconnect Device (MID), used in place of lead frames in the device, can be used to create a connection between the active optical element and the camera housing or surrounding devices, in which case connection to the embedded active optical element can be achieved by means of conductive adhesives.

SUMMARY

In accordance with the present invention, a wafer level camera module is provided that includes an electrically controllable active optical element, such as a tunable liquid crystal lens. The module has an electrical conduction path from the active optical element to a mounting surface of the camera module, where a surface conductor is located. The surface conductor is in electrical contact with the electrical conduction path and is configured to make electrical contact with a conductor on a host substrate to which the camera module is mounted.

In an embodiment, the surface conductor includes at least one solder ball that is part of a ball grid array-like package when the camera module is fully assembled. The camera module can also be compatible with an automatic pick-and-place process for mounting the camera module to a host substrate. The surface conductor can also be part of a first group of surface conductors for the active optical element. The module can also include a second group of surface conductors that are arranged to be co-planar with the first group, and the first group and second group of surface conductors can be arranged in a predetermined pattern on the mounting surface of the module. The second group of conductors can, for example, provide electrical connection to an imaging device of the camera module, such as a CMOS sensor pre-assembled in a ball grid array package suitable for wafer level assembly.

In an embodiment of the proposed solution, the electrical conduction path from the active optical element to the mounting surface can make use of a flexible circuit board that has a stiffener, on the bottom surface of which is located the first group of surface conductors. Upon assembly of the camera module, the flexible circuit board can at least partially surround the active optical element while providing electrical contact between the active optical element and the first group of surface conductors on the stiffener. The electrical connection between the flexible printed circuit and the active optical element can include conductive film bonding, such as an anisotropic conductive film bonding process, or a conductive adhesive. The flexible printed circuit can be mounted in such a way as to ensure that, once assembled, the flexible printed circuit is able to compress or bend to accommodate variations in lens height tolerance.

The stiffener of the flexible printed circuit can have alignment holes to ensure proper alignment between the first group of surface conductors and the second group. In addition, the camera module can also include a housing that receives and contains all of the elements of the camera module upon its assembly, and that housing can support and position the stiffener in order to ensure proper relative positioning between the first group and the second group of surface conductors. In particular, the housing can include a flange for receiving the stiffener, where the flange includes at least one alignment hole arranged to align with at least one alignment hole of the stiffener upon camera module assembly. The housing can, for example, include a polymer or plastic material.

BRIEF DESCRIPTION OF THE DRAWINGS

The invention will be better understood by way of the following detailed description of embodiments of the invention with reference to the appended drawings, in which:

FIG. 5A is a side view of the wafer level camera module of FIG. 1;

FIG. 5B is a bottom view of the wafer level camera module of FIG. 1;

DETAILED DESCRIPTION

Figure 1:
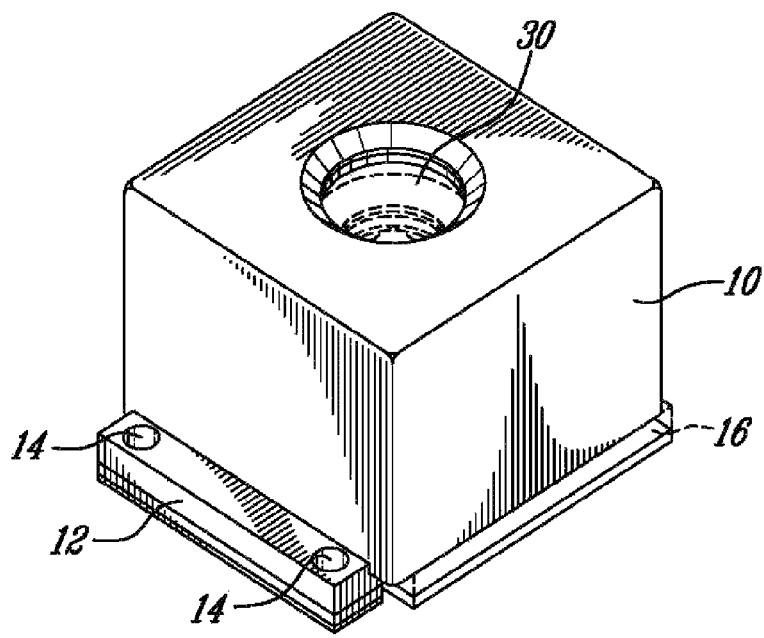
FIG. 1 is a top perspective view of a wafer level camera module according to the proposed solution.

Shown in FIG. 1 is a fully assembled Wafer Level Camera (WLC) module including an active optical element, according to a non-limiting embodiment of the proposed solution. Such a camera module can be intended for integration into a portable telephone, for example, or more specifically for mounting on the main Printed Circuit Board (PCB) of a cellular telephone. A camera housing 10 in this embodiment is roughly cubical, although it can take a number of different forms as well. The camera housing (or "cover") 10 can be a molded component that prevents light leakage into the camera and protects the camera module. The camera housing cover is designed and molded in such a way that it is able to receive and contain all of the various elements of the camera module. In one implementation, the camera housing 10 is made of a polymer material, such as but not limited to plastic. Camera housing 10 also includes a flange 12 that, as discussed in more detail below, which is used to cover a portion of an internal flexible circuit board, and includes alignment holes 14 via which the internal components of the camera can be mutually aligned. The cover 10 (12) sits on a base substrate 16, which can be an optical detector package that includes a CMOS image sensor in a Ball Grid Array (BGA) Chip-Scale Package (CSP) suitable for wafer level assembly. As assembled, the WLC module of FIG. 1 is ready for direct reflow mounting to a PCB, for example by an automatic pick-and-place process.

Figure 2:
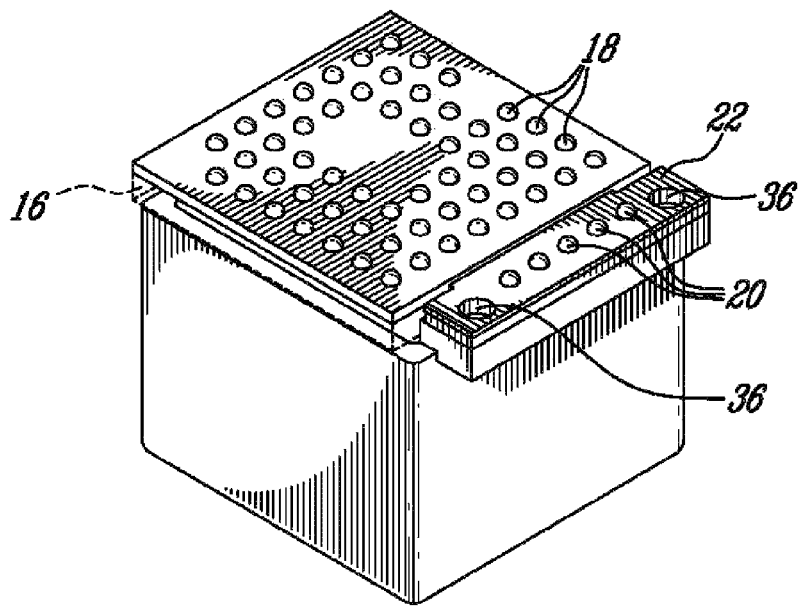
FIG. 2 is a bottom perspective view of the wafer level camera module of FIG. 1.

As shown in FIG. 2, which is a perspective view of the underside of the assembly illustrated in FIG. 1, the bottom surface of the base substrate 16 has a multitude (plurality) of solder balls 18 via which electrical contact can be made with device components, such as an image sensor. Solder balls 20 are also located on the underside of a stiffener portion 22 of a flexible circuit board, which is discussed in more detail below. Thus, the assembly process itself provides for all of the necessary electrical connections to the active optical element of the camera, such as a Tunable Liquid Crystal Lens (TLCL), without requiring any additional steps to make the necessary electrical contact(s).

The active optical element can comprise a tunable lens, shutter, beam steering device, diaphragm, variable filter, etc. as will be apparent to a person skilled in the art.

Figure 3:
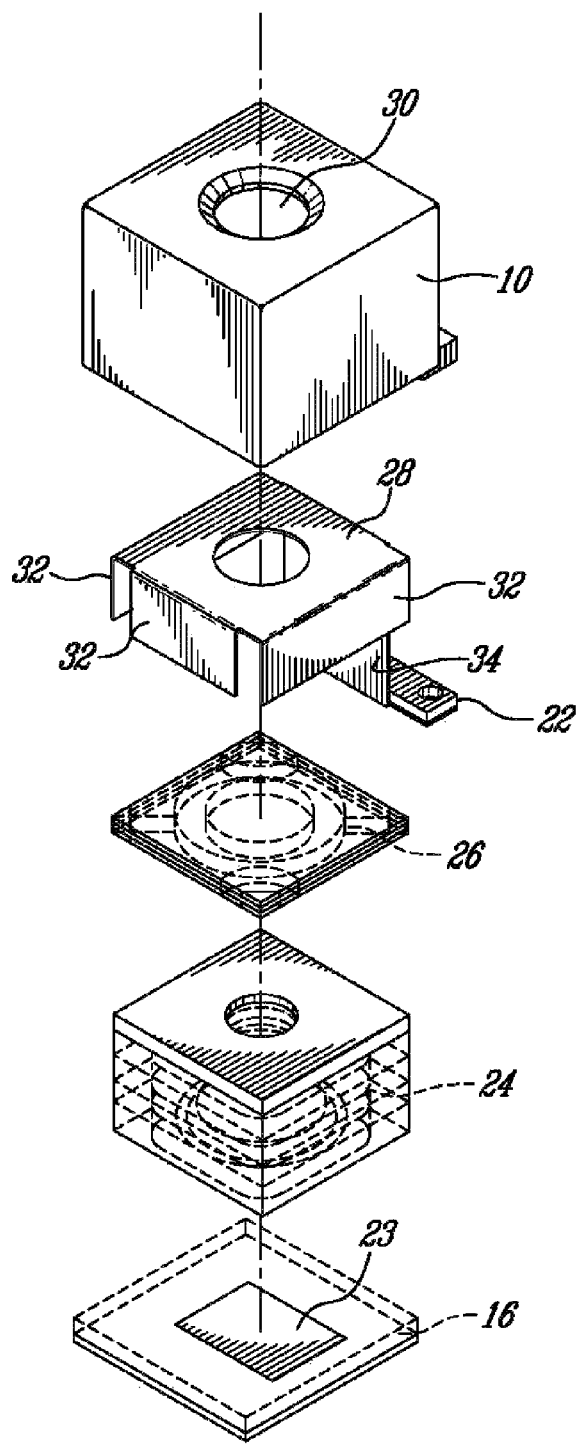
FIG. 3 is an exploded view of the wafer level camera module of FIG. 1, illustrating various components of the camera module.

As seen in the exploded view of FIG. 3, the wafer camera module is formed of various separate elements, which are assembled together within the molded camera cover (10). In a specific, non-limiting example of implementation of the proposed solution, these elements include an image CMOS sensor 23, a wafer level fixed lens structure 24, an active optical element such as TLCL 26 and a flexible printed circuit 28 providing an electrical circuit conduction path for the active optical element.

The image CMOS sensor is pre-packaged in Ball Grid Array (BGA) Chip-Scale Package (CSP) 16 suitable for wafer level assembly. As shown in FIG. 2, the CMOS sensor BGA-CSP is characterized by a plurality of solder balls provided on its bottom surface. These solder balls are intended for reflow soldering to a PCB upon mounting of the fully assembled camera module to a device, such as the PCB of a cellular phone, thus making electrical connections between the image sensor (23) and the device substrate.

The wafer level fixed lens structure 24 includes multiple lens elements suitable for focusing incident light onto the image CMOS sensor 23. This fixed lens structure 24, which can be mounted on a glass substrate and can be characterized by various shapes, sizes and thicknesses, acts to focus light from a subject that is collected via the aperture of the camera. In one embodiment, the wafer level fixed lens structure (24) is characterized by multiple glass layers with replicated surfaces, forming an optical structure similar to conventional lens elements in a camera. Light from a subject in front of the fixed lens structure (24) is collected via entrance aperture 30 and is focused by the lens structure (24) to form an image on a desired imaging device, in this case the CMOS sensor 23 of the WLC. The TLCL can be located at any desired position within the stack of lenses. The aperture of the TLCL can be made smaller when the TLCL is located within the stack at a position where the lens aperture is smaller.

The active optical element 26 of the module shown in FIG. 3 is a tunable lens, providing an auto focus function for the wafer level camera. In the present embodiment, the tunable lens is a Tunable Liquid Crystal Lens (TLCL), such as that discussed in U.S. Provisional Patent Application Ser. No. 61/059,274, filed Jun. 6, 2008, the substance of which is incorporated herein by reference. As is discussed in this and other disclosures, a TLCL is a liquid crystal based lens structure for which the focusing power changes with changes to an applied electric field. As the electric field is typically generated by an input electrical signal, variation of that signal can be used to change the tuning of the lens. The tuning range of the TLCL may include a zero optical power level at which it adds no focusing effect to the overall lens structure. However, as the electrical signal supplied to the TLCL changes, the optical power of the liquid crystal lens changes with it, causing an overall change in the focal length of the variable focus lens.

In the example illustrated in FIG. 3, the TLCL 26 is separate from the wafer level fixed lens structure 24, positioned adjacent the fixed lens structure 24 within the assembled camera module. However, the TLCL 26 can also be located at different positions within the assembled camera module, without departing from the scope of the present invention. For example, the TLCL 26 can be integrated within the fixed lens structure (24), sandwiched between two of the layers, thus forming a variable focus lens structure. Advantageously, when a TLCL is included in the lens stack of the fixed lens structure, the focus plane of the fixed lens structure can be actively adjusted to compensate for improper distance of the lens stack from the CMOS sensor 23. It can also be advantageous to locate the TLCL 26 at a position in the lens camera module where the light passing through it will be at a relatively narrow focus, that is, where a cross sectional area of the light passing through the TLCL 26 is minimum. In this way, the size of the TLCL 26 and the actively controlled area of the lens can be minimized. In another variation of the proposed solution, the TLCL can be part of a structure that has a TLCL located in a substrate to which is attached one or more fixed lenses. A lens structure such as this is disclosed in International Patent Application PCT/CA2009/001181, the substance of which is incorporated herein by reference.

Figure 4:
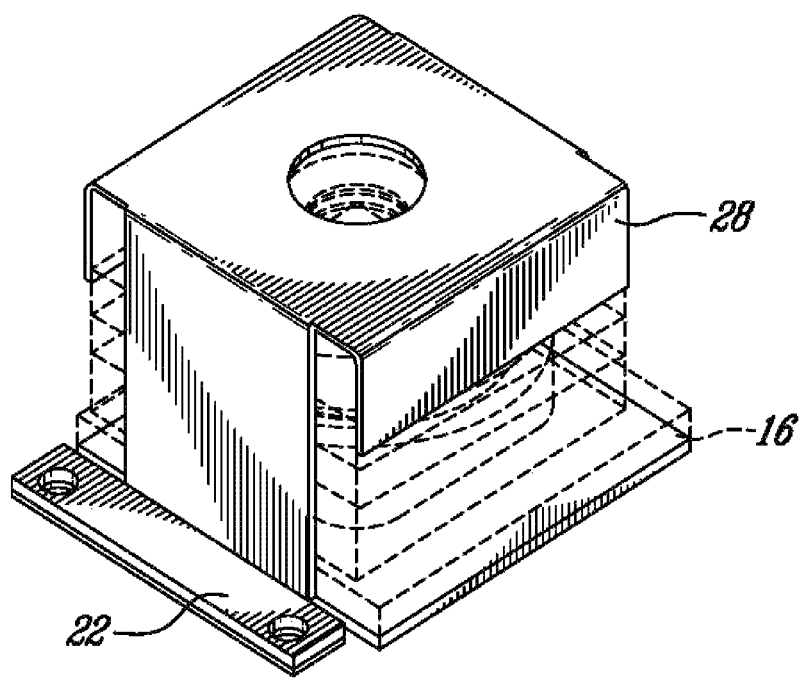
FIG. 4 is a perspective view of the wafer level camera module of FIG. 1, partially disassembled to reveal a flexible contact structure provided within the stack of elements.

Specific to the present proposed solution, Flexible Printed Circuit (FPC) 28 is provided within the camera module to create electrical conduction paths (electrical connections) from the active optical element, i.e. the TLCL 26, to the substrate on which is mounted the camera module, e.g. the PCB of a cellular phone. As shown in the example of FIG. 3, the FPC 28 is shaped to receive and contain the TLCL 26 of the camera module, as well at least a portion of the fixed lens structure 24. More specifically, the FPC 28 has a substantially flat upper surface, bearing an aperture substantially matching the camera aperture 30, with four walls 32 (tabs) extending downwardly therefrom. A particular one of these walls has a portion 34 that extends into stiffener 22 of the FPC, the height of this particular wall being such that, upon assembly of the WLC module, the stiffener 22 of the FPC is substantially co-planar with the CSP-BGA sensor package 16. The perspective view of FIG. 4, which depicts the assembled camera module without cover 10, illustrates how the FPC 28 fits over the TLCL 26 and fixed lens structure 24, such that the bottom of stiffener 22 is substantially aligned with the bottom of base substrate 16.

As illustrated in FIG. 2, the stiffener 22 of the FPC 28 includes multiple solder balls 20 provided on the bottom thereof, for reflow soldering of the FPC (PCB) to a host circuit board upon mounting of the camera module thereto. The solder balls 20 on the stiffener 22 are characterized by a specific spacing, size and shape in order to substantially match that of the solder balls 18 of the sensor BGA. This similarity among all of the solder balls and their spacing can be important to ensure that the fully assembled WLC, including the TLCL, is a BGA-like package. In addition to being illustrated in FIG. 2, the spacing and positioning of the solder balls 18 and 20 in the present embodiment are illustrated in FIGS. 5A and 5B which represent, respectively, a side view and a bottom view of the assembled camera module.

As is well known in the art, an FPC bears conductive pathways or traces that serve to make electrical connections. In the case of the WLC module of the present proposed solution, the conductive pathways of the FPC 28 allow convenient electrical signal routing between the TLCL 26 and the PCB of a cellular phone. More specifically, the FPC is designed such that its conductive pathways or traces are provided thereon according to a layout that ensures electrical connection can be made to one or more contact points of the TLCL, when this TLCL 26 is received within the FPC 28. These conductive pathways or traces run down the particular wall of the FPC that ends in the stiffener 22, thus conducting signals to the active optical element from the conductors (i.e., solder balls 20) of the stiffener 22.

The FPC can be mounted and electrically connected to the TLCL 26 by way of conductive film bonding, such as an Anisotropic Conductive Film (ACF) bonding process, or by using conductive adhesive (e.g., conductive sheet adhesives), among many other possibilities. Advantageously, the use of conductive sheet adhesives to mount the FPC to the TLCL allows for the FPC to strain-relieve itself as it conforms to the lens stack of the camera module. Alternatively, at least one side of the FPC 28 can be given clearance space and left without bonding to the TLCL, thus allowing the FPC to compress or otherwise bend to accommodate variations in lens height tolerance.

In the context of a fully assembled WLC, the stiffener 22 of the FPC can be reflow soldered (to a substrate of the WLC module) for example to a cell phone PCB. Accordingly, the FPC 28 is operative to conduct electrical signals between the variable focus lens structure (i.e., TLCL 26) of the WLC module and the PCB, along the vertical wall of the camera module and via the electrical contact points made between the stiffener 22 and the PCB. As shown in FIG. 2, the stiffener 22 of the FPC 28 is characterized by a pair of alignment holes 36 used to align the FPC to the camera cover 10, as will be discussed in further detail below. This stiffener 22 can also be used to create a proper structure for attachment of the camera module to the PCB.

Upon assembly, the cover 10 is aligned with and attached to both the sensor BGA 16 and the FPC 28, in order to maintain these two elements in proper aligned position within the cover 10. As discussed above, the camera cover (or housing) 10 includes a flange 12 at its bottom end, which has alignment holes 14 for providing proper alignment of the elements of the camera module. More specifically, upon assembly of the WLC module, the stiffener 22 of the FPC 28 is received within the flange 12 of the camera cover 10, and the alignment holes 36 of the stiffener 22 are aligned with the alignment holes 14 of the camera cover flange 12, thus ensuring proper alignment of the solder balls 20 on the FPC with the solder balls 18 of the CMOS sensor BGA 16. More specifically, the solder balls 20 of the FPC stiffener 22 are positioned to be physically substantially parallel with the solder balls 18 of the sensor BGA 16 when the camera is fully assembled.

The WLC module can be constructed following different assembly sequences, depending on test and yield requirements of different elements of the camera. In a specific, non-limiting example, the elements of the WLC module are assembled in the following sequence:
 1. Attach the TLCL to the wafer level fixed lens structure in wafer form.
 2. Assemble this variable focus lens structure to a CSP packaged wafer of CMOS sensors.
 3. Dice and separate the modules to form individual wafer level camera modules.
 4. Attach the FPC to a WLC module using an anisotropic conductive film (ACF) bonding process or a conductive adhesive.
 5. Attach the camera cover to the CSP package and FPC, using the alignment holes to create proper alignment of solder balls on the FPC to the camera cover and in turn to the solder balls on the BGA-CSP.

Figure 6:
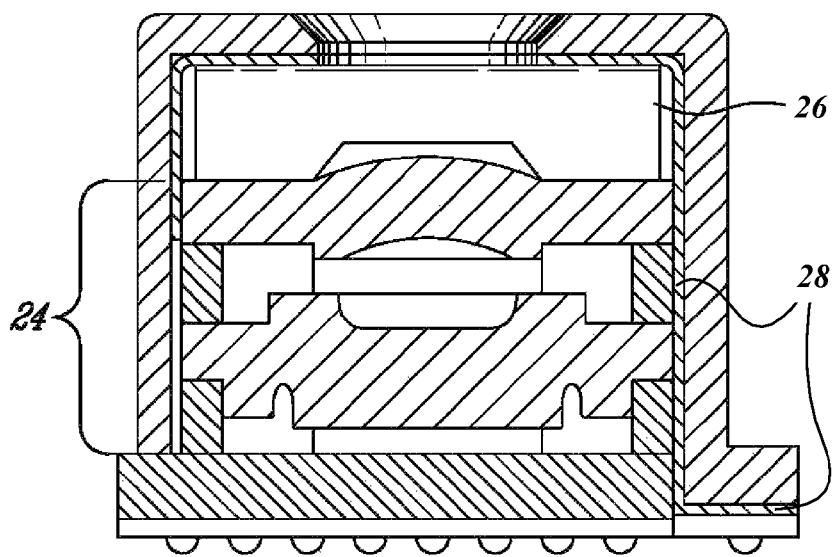
FIG. 6 is a cross-sectional side view of the wafer level camera module of FIG. 1.

The fully assembled wafer level camera module is illustrated in the external perspective view of FIG. 1, and is also illustrated in partial cross-section in FIG. 6. In the view of FIG. 6, the TLCL 26 is illustrated to indicate its position relative to the module components (FPC 28). The module is a structured BGA-like package that includes an active optical element, notably the auto-focus TLCL 26 along with a fixed lens structure 24 and FPC 28. Advantageously, this packaging of the WLC with active optical element allows for the active optical element to be assembled to the PCB of a cellular phone like any other BGA, without the need for additional or special assembly steps to make the necessary electrical connections to the active optical element. The packaged WLC module, in its final assembled form, is a fully testable component that can be mounted to a PCB using an automatic pick-and-place process and reflow soldering.

Figure 7:
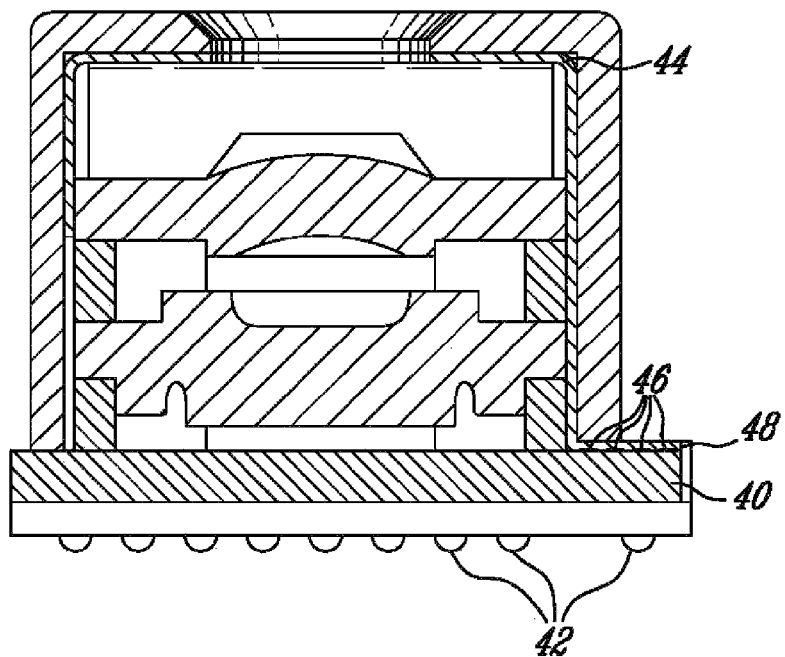
FIG. 7 is a cross-sectional side view of the wafer level camera module of an alternative embodiment similar to FIG. 1 in which the active element contacts connect with the top surface of the image sensor.

An alternative embodiment of the proposed is shown in FIG. 7. In this embodiment, the base substrate 40 extends further than the base substrate 16 of FIGS. 1-6 and has solder balls 42 that provide connection points both for the image sensor and the for the active optical element. Electrical contact to the active optical element is made via flexible printed circuit 44, which makes contact with conductive pads 46 on the top of the substrate 40 that are, in turn, connected to respective solder balls 42 on the bottom surface of the substrate. The flexible printed circuit 44 is similar to flexible printed circuit 28 of the foregoing embodiments, but does not include stiffener 22. Rather, the contact portion 48 has electrical contacts that make a connection with the conductive pads 46 of the substrate. Thus, in this embodiment, there is only one continuous contact surface on the base of the (WLC) device, and there is no need to align two portions at the mounting surface of the camera module.

Figure 8:
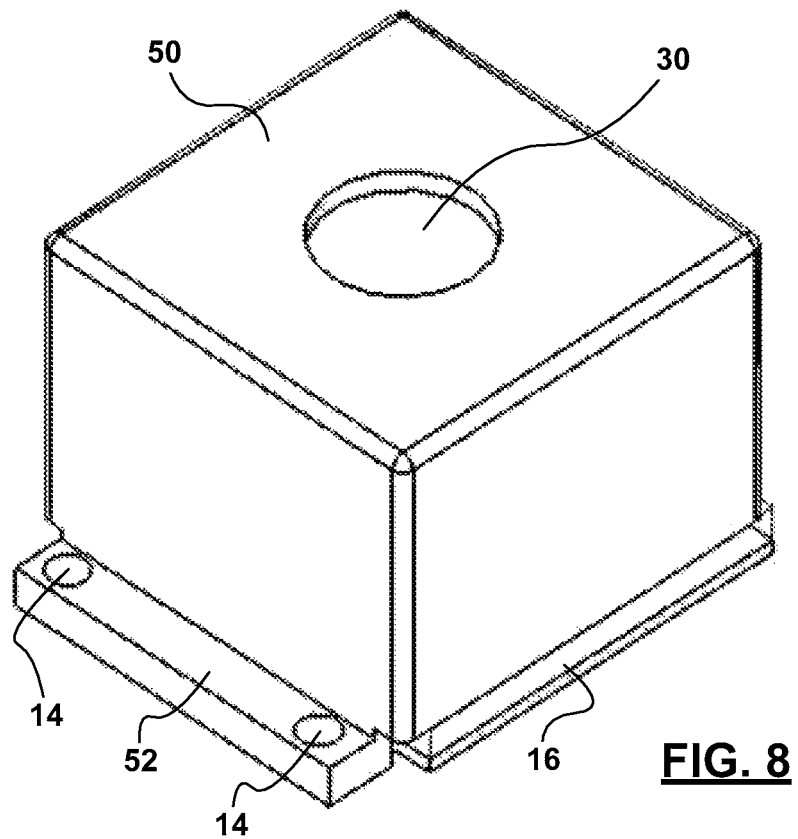
FIG. 8 is a top perspective view of a wafer level camera module according to another embodiment of the proposed solution.

Shown in FIG. 8 is a fully assembled Wafer Level Camera (WLC) module including an active optical element, according to another non-limiting embodiment of the proposed solution. For example such a WLC module can be integrated into a portable telephone or more specifically intended for mounting on a main Printed Circuit Board (PCB) of a cellular telephone. A camera housing 50 in this embodiment is roughly cubical, although it can take a number of different shapes as well. The camera housing (or "cover") 50 can be a molded component which prevents light leakage into the camera and protects the WLC module. The camera housing cover 50 is designed and molded in such a way that it is able to receive and contain all of the various elements of the WCL module. In one implementation, the camera housing 50 is made of a polymer material, such as but not limited to plastic. Camera housing 50 also includes a flange 52 which includes alignment holes 14 via which the internal components of the camera can be mutually aligned. As discussed in more detail below, flange 52 is used to carry portion of an internal LDS (Laser Direct Structuring) circuit structure used inside the plastic housing. The cover 50 (52) sits on a base substrate 16, which can be an optical detector package which for example includes a CMOS image sensor in a Ball Grid Array (BGA) Chip-Scale Package (CSP) suitable for wafer level assembly. As assembled, the WLC module of FIG. 8 is ready for direct reflow mounting to a PCB, for example by an automatic pick-and-place process.

Figure 9:
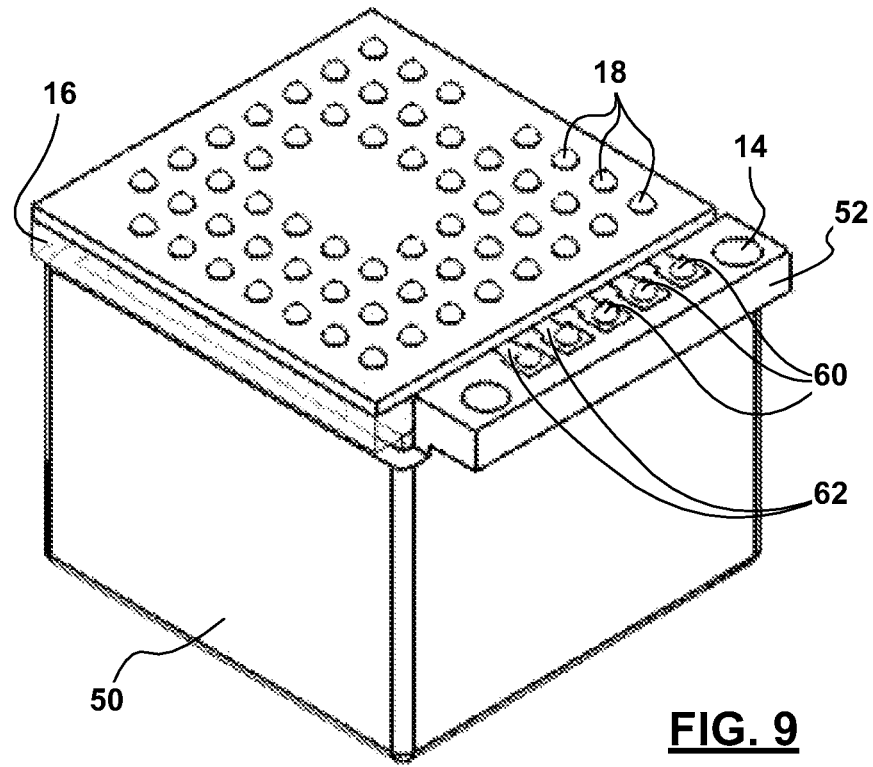
FIG. 9 is a bottom perspective view of the wafer level camera module of FIG. 8.

As shown in FIG. 9, which is a perspective view of the underside of the assembly illustrated in FIG. 8, the bottom surface of the base substrate 16 has a multitude (plurality) of solder balls 18 via which electrical contact can be made with device components, such as an image sensor. Solder balls 60 are also located on the underside of flange portion 52 supporting the LDS circuit structure, which is discussed in more detail below. The assembly process itself provides for all of the necessary electrical connections to the active optical element of the camera, such as a Tunable Liquid Crystal Lens (TLCL), without requiring any additional steps to make the necessary electrical contact(s).

The active optical element can comprise a tunable lens, shutter, beam steering device, diaphragm, variable filter, etc. as will be apparent to a person skilled in the art.

Figure 11:
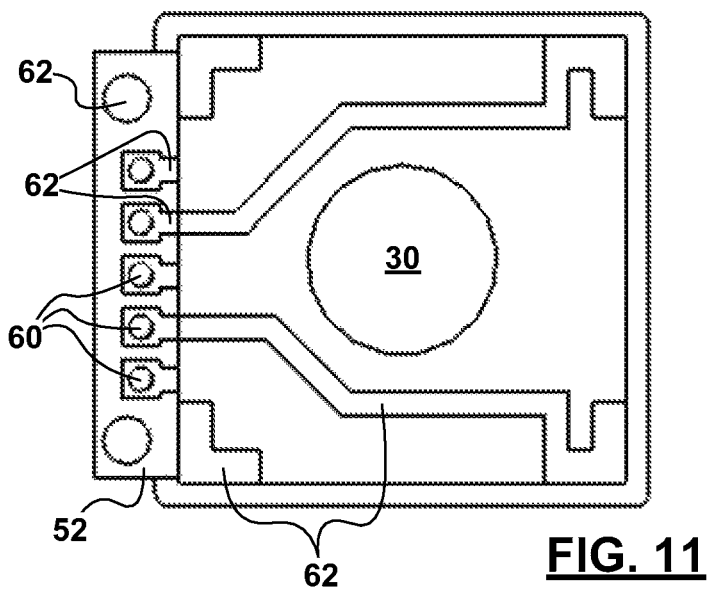
FIG. 11 is a bottom view of the camera housing illustrated in FIG. 10.
Figure 10:
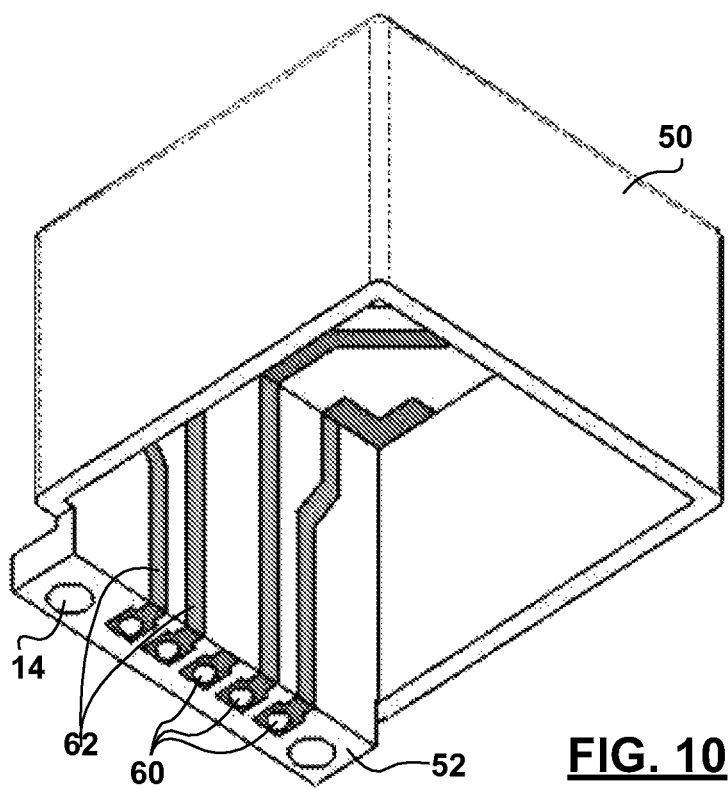
FIG. 10 is bottom perspective view of the camera housing having a laser direct structuring circuit structure thereon.

With reference to FIGS. 10 and 11, Laser Direct Structuring (LDS) is a process which enables an injection molded component, such as camera housing 50 to be selectively plated with discrete conductive pathways 62 collectively forming an LDS circuit structure. Without limiting the invention, the camera housing 50 is injection molded using a polymer compound formulated specifically for the LDS process. The camera housing 50 is then traced with a laser in the pattern of the LDS circuit structure to activate the surface of the camera housing 50 in the areas traced with the laser. The camera housing 50 then undergoes a plating process, for example with electroless copper, electroless nickel and immersion gold. The resulting circuit pathways conforming to the laser pattern of the LDS circuit structure.

As illustrated in FIGS. 10 and 11, the LDS process provides an LDS circuit trace structure which follows the contour of the injection molded camera housing 50 in three dimensions. By integrating an electrical circuit conduction path directly onto the camera housing 50, manufacturing, stocking, and assembling discrete connecting parts such as the flexible printed circuit components can be reduced.

Figure 12:
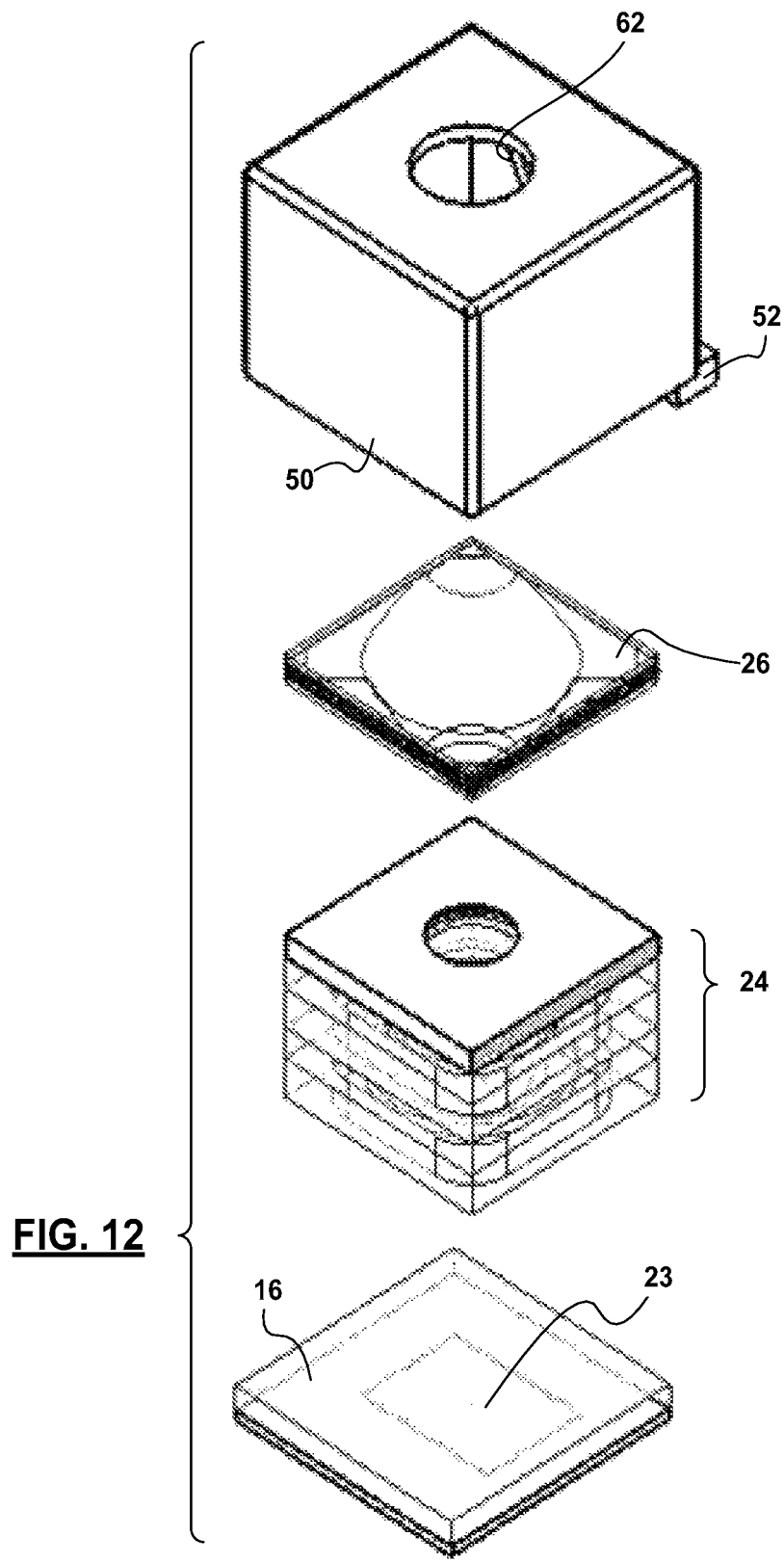
FIG. 12 is an exploded view of the wafer level camera module of FIG. 8, illustrating various components of the camera module.

As seen in the exploded view of FIG. 12, the wafer camera module is formed of various separate elements, which are assembled together within the molded camera cover 50. In a specific, non-limiting example of implementation of the proposed solution, the elements include an image CMOS sensor 23, a wafer level fixed lens structure 24, an active optical element such as TLCL 26 and the camera housing 50 having the LDS circuit structure (62) providing an electrical circuit conduction path for the active optical element.

Specific to the present proposed solution, the LDS circuit structure (62) is provided within the camera module to create electrical conduction paths (electrical connections) from the active optical element, i.e. the TLCL 26, to the substrate on which the camera module is mounted, e.g. the PCB of a cellular phone. As shown in the example of FIG. 10, the camera housing 50 with the LDS circuit structure (62) is shaped to receive and contain the TLCL 26 of the camera module, as well (at least a portion of) the fixed lens structure 24. More specifically, the LDS circuit structure (62) has conductive pathways 62 along the walls and flange 52 of the camera housing 50. A particular one of these walls extends into flange 52, the height of this particular wall being such that, upon assembly of the WLC module, the flange 52 is substantially co-planar with the CSP-BGA sensor package 16 for example as illustrated in FIG. 9. The assembled camera module with cover 50 fits over the TLCL 26 and fixed lens structure 24 such that the bottom of flange 52 is substantially aligned with the bottom of base substrate 16.

Figure 13A:
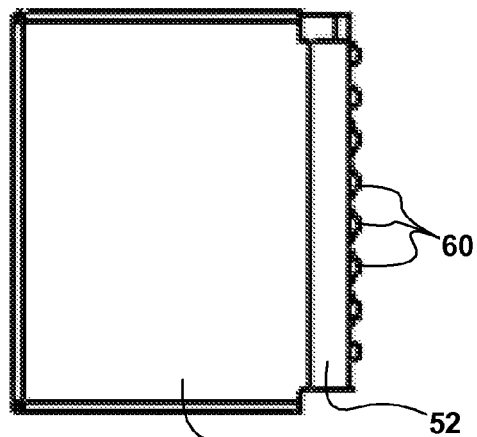
FIG. 13A is a side view of the wafer level camera module of FIG. 8.
Figure 13B:
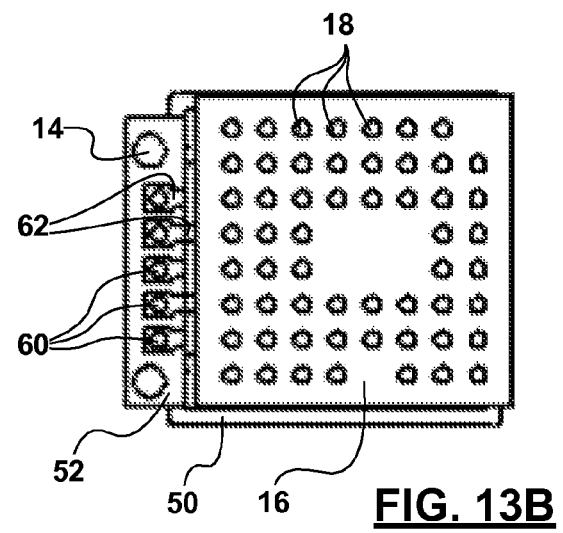
FIG. 13B is a bottom view of the wafer level camera module of FIG. 8.

As illustrated in FIG. 9, the flange 52 includes multiple solder balls 60 provided on the bottom thereof, for reflow soldering of to a host circuit board upon mounting of the camera module thereto. The solder balls 60 on the flange 52 are characterized by a specific spacing, size and shape in order to substantially match that of the solder balls 18 of the sensor BGA. This similarity among all of the solder balls and their spacing can be important to ensure that the fully assembled WLC, including the TLCL, is a BGA-like package. In addition to being illustrated in FIG. 9, the spacing and positioning of the solder balls 18 and 60 in the present embodiment are illustrated in FIGS. 13A and 13B which represent, respectively, a side view and a bottom view of the assembled camera module.

The LDS circuit structure bears conductive pathways 62 or traces that serve to make electrical connections. In the case of the WLC module of the present proposed solution, the conductive pathways 62 of the LDS circuit structure allow convenient electrical signal routing between the TLCL 26 and the PCB of a cellular phone. More specifically, LDS circuit structure on the camera housing 50 is designed such that its conductive pathways 62 or traces are provided thereon according to a layout that ensures electrical connection can be made to one or more contact points of the TLCL, when this TLCL 26 is received within the camera housing 50. These conductive pathways 62 or traces run down the particular wall of the camera housing 50 that ends in the flange 52, thus conducting signals to the active optical element (26) from the conductors (i.e., solder balls 60) of the flange 52.

The LDS circuit structure can be electrically connected to the TLCL 26 by way of conductive film bonding, such as an Anisotropic Conductive Film (ACF) bonding process, or by using conductive adhesive (e.g., conductive sheet adhesives), among many other possibilities. Advantageously, the use of conductive sheet adhesives to mount the camera housing 50 with the LDS circuit structure thereon to the TLCL 26 allows for strain-relief between the camera housing 50 the lens stack 24 of the camera module.

In the context of a fully assembled WLC, the flange 52 of the camera housing 50 can be reflow soldered for example to a cell phone PCB. Accordingly, the LDS circuit structure is operative to conduct electrical signals between the variable focus lens structure (i.e., TLCL 26) of the WLC module and the PCB, along the vertical wall of the camera module 50 and via the electrical contact points made between the flange 52 and the PCB. As shown in FIG. 9, the flange 52 of the camera housing 50 is characterized by a pair of alignment holes 14 used to create a proper structure for attachment of the camera module to the PCB.

Upon assembly, the cover 50 is aligned with and attached to the sensor BGA 16 in order to maintain these two elements in proper aligned position. As discussed above, the camera cover (or housing) 50 includes a flange 52 at its bottom end, which has alignment holes 14 for providing proper alignment of the elements of the camera module. More specifically, upon assembly of the WLC module, the flange 52 of the camera cover 50 employs the alignment holes 14 to ensure proper alignment of the solder balls 60 on the flange 52 with the solder balls 18 of the CMOS sensor BGA 16. More specifically, the solder balls 60 of the flange 52 are positioned to be substantially parallel with the solder balls 18 of the sensor BGA 16 when the camera is fully assembled.

The WLC module can be constructed following different assembly sequences, depending on test and yield requirements of different elements of the camera. In a specific, non-limiting example, the elements of the WLC module are assembled in the following sequence:
1. Attach the TLCL to the wafer level fixed lens structure in wafer form.
2. Assemble this variable focus lens structure to a CSP packaged wafer of CMOS sensors.
3. Dice and separate the modules to form individual wafer level camera modules.
4. Attach the camera cover to the CSP package using an anisotropic conductive film (ACF) bonding process or a conductive adhesive and using the alignment holes to create proper alignment between solder balls on the flange 52 and the solder balls on the BGA-CSP.

Figure 14:
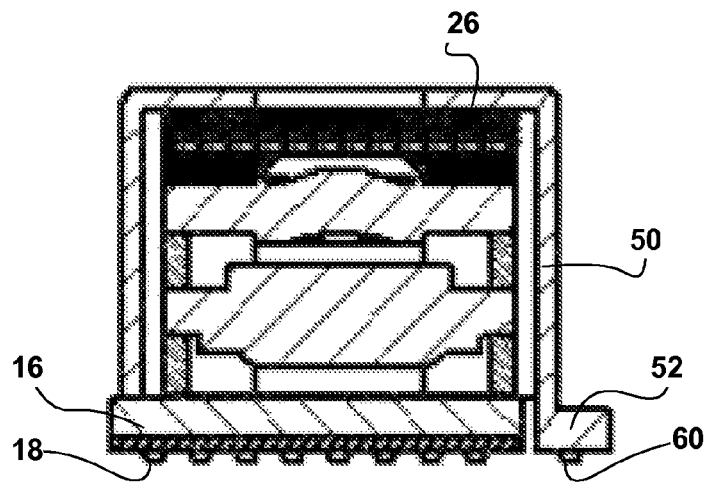
FIG. 14 is a cross-sectional side view of the wafer level camera module of FIG. 8, wherein similar features bear same labels.

The fully assembled wafer level camera module is illustrated in the external perspective view of FIG. 8, and is also illustrated in partial cross-section in FIG. 14. In the view of FIG. 14, the TLCL 26 is illustrated to indicate its position relative to the module components. The module is a structured BGA-like package that includes an active optical element, notably the auto-focus TLCL 26 along with a fixed lens structure 24. Advantageously, this packaging of the WLC with active optical element allows for the active optical element to be assembled to the PCB of a cellular phone like any other BGA, without the need for additional or special assembly steps to make the necessary electrical connections to the active optical element. The packaged WLC module, in its final assembled form, is a fully testable component that can be mounted to a PCB using an automatic pick-and-place process and reflow soldering.

The control of the focus can be implemented using control circuitry (not shown) connected to the TLCL. For a description of an autofocus circuit for a TLCL, reference is made to PCT publication WO/2010/022080 published on 25 Feb. 2010, which is incorporated herein by reference.

The invention is not limited to active optical elements, such as TLCL 26, having top surface electrical contact structures, and can apply equally well active optical elements having an edge connect structure as described in International Patent Application PCT/CA2009/000742 filed Jun. 5, 2009, which is incorporated herein by reference.

It is important to note that the above-described embodiments and examples of implementation of the present proposed solution have been presented for illustration purposes but that additional variants and modification are possible and should not be excluded from the scope of the present invention. For example, the wafer level camera module can include additional elements, with varying functionality, without departing from the scope of the present invention.

What is claimed is:
1. A wafer level camera module comprising:
an electrically controllable active optical element;
an electrical conduction path from the active optical element to a mounting surface of the camera module, said electrical conduction path being configured to provide electrical contact between said active optical element and said mounting surface;
a surface conductor located on said mounting surface of the camera module, the surface conductor being in electrical contact with said electrical conduction path and being configured to make electrical contact with a conductive path on a host substrate to which the camera module is mounted, the surface conductor being part of a first group of surface conductors for the active optical element;
a second group of surface conductors arranged to be substantially co-planar with the first group of surface conductors; and
a housing for receiving and containing elements of said camera module upon assembly thereof, said housing being operative to ensure proper relative positioning between said the first group of surface conductors and the second group of surface conductors.
2. A wafer level camera module as defined in claim 1, wherein said surface conductor further comprises at least one solder ball that is part of a ball grid array-like package when said camera module is fully assembled.

3. A wafer level camera module as defined in claim 1, wherein said camera module is configured to be compatible with an automatic pick-and-place process for mounting said camera module to the host substrate.

4. A wafer level camera module as defined in claim 1, wherein the first group of surface conductors and said second group of surface conductors are arranged in a predetermined pattern on said mounting surface.

5. A wafer level camera module as defined in claim 4, wherein said second group of surface conductors are configured to provide electrical connection to an imaging device of said camera module.

6. A wafer level camera module as defined in claim 5, wherein said imaging device further comprises an image CMOS sensor pre-assembled in a ball grid array package suitable for wafer level assembly.

7. A wafer level camera module as defined in claim 4, wherein said electrical conduction path is part of a flexible printed circuit bearing said first group of surface conductors for said active optical element.

8. A wafer level camera module as defined in claim 7, wherein said flexible printed circuit includes a stiffener on a bottom surface of which is located the first group of surface conductors.

9. A wafer level camera module as defined in claim 8, wherein said flexible printed circuit is configured to at least partially surround said active optical element upon assembly of said camera module, said flexible printed circuit providing electrical contact between said active optical element and said first group of surface conductors on said stiffener.

10. A wafer level camera module as defined in claim 9, wherein said flexible printed circuit is electrically connected to said active optical element using at least one of conductive film bonding and conductive adhesive.

11. A wafer level camera module as defined in claim 10, wherein said conductive film bonding comprises an anisotropic conductive film bonding process.

12. A wafer level camera module as defined in claim 9, wherein said flexible printed circuit is configured to be mounted and electrically connected to said active optical element in such a way as to ensure that, once assembled, said flexible printed circuit is able to compress or bend to accommodate variations in lens height tolerance.

13. A wafer level camera module as defined in claim 9, wherein said stiffener includes at least one alignment hole for ensuring proper alignment between the first group of surface conductors and the second group of surface conductors.

14. A wafer level camera module as defined in claim 13, wherein said housing being operative to support and position said stiffener of said flexible printed circuit in order to ensure proper relative positioning between the first group of surface conductors and the second group of surface conductors.

15. A wafer level camera module as defined in claim 14, wherein said housing further comprises a flange for receiving said stiffener of said flexible printed circuit, said flange including at least one alignment hole arranged to align with said at least one alignment hole of said stiffener upon assembly of said camera module.

16. A wafer level camera module as defined in claim 15, wherein said housing is made of polymer material.

17. A wafer level camera module as defined in claim 16, wherein said polymer material is a plastic material.

18. A wafer level camera module as claimed in claim 4, said electrical conduction path being part of a Laser Direct Structuring (LDS) circuit structure configured to provide electrical contact between said active optical element and said first group of surface conductors.

19. A wafer level camera module as claimed in claim 18, said camera housing including a flange on a bottom surface of which the first group of surface conductors is located, said LDS circuit structure including a plurality of conductive paths in electrical contact with said first group of surface conductors.

20. A wafer level camera module as claimed in claim 19, said flange including at least one alignment hole for ensuring proper alignment between said first group of surface conductors and said second group of surface conductors.

21. A wafer level camera module as claimed in claim 18, said LDS circuit structure being electrically connected to said active optical element using at least one of conductive film bonding and conductive adhesive.

22. A wafer level camera module as claimed in claim 21, said conductive film bonding comprising an anisotropic conductive film bonding process.

23. A wafer level camera module as claimed in claim 18, said LDS circuit structure being configured to be electrically connected to said active optical element providing, once assembled, stress relief between said camera housing and said active optical element.

24. A wafer level camera module as claimed in claim 1, said housing being made of polymer material.

25. A wafer level camera module as claimed in claim 24, said polymer material including a plastic material.

26. A wafer level camera module as defined in claim 1, wherein said active optical element is a tunable lens.

27. A wafer level camera module as defined in claim 26, wherein said active optical element is a tunable liquid crystal lens.

* * * * *